(12) United States Patent
Kusaka

(10) Patent No.: US 6,806,670 B2
(45) Date of Patent: Oct. 19, 2004

(54) ENERGY CONVERTER CONTROL APPARATUS, AND CONTROL METHOD THEREOF

(75) Inventor: Yasushi Kusaka, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 13 days.

(21) Appl. No.: 10/413,404

(22) Filed: Apr. 15, 2003

(65) Prior Publication Data
US 2003/0210006 A1 Nov. 13, 2003

(30) Foreign Application Priority Data
May 9, 2002 (JP) ........................................ 2002-134642

(51) Int. Cl.$^7$ ............................................... H02K 23/16
(52) U.S. Cl. ...................... 318/437; 318/254; 318/138; 318/439; 318/430; 318/432; 318/433
(58) Field of Search ................................. 318/254, 138, 318/439, 437, 430, 432, 433, 504, 521, 494

(56) References Cited

U.S. PATENT DOCUMENTS 6,326,748 B1 * 12/2001 Moroto et al. ............... 318/254
6,353,297 B1 * 3/2002 Meyer ......................... 318/273

FOREIGN PATENT DOCUMENTS

| JP | A 9-47066 | 2/1997 |
| JP | A 10-80188 | 3/1998 |
| JP | A 2001-128484 | 5/2001 |

* cited by examiner

Primary Examiner—Karen Masih
(74) Attorney, Agent, or Firm—Oliff & Berridge PLC

(57) ABSTRACT

A magnitude of current that does not cause electric power generation is supplied to a field winding of a movable element, and an induced voltage generated in a armature winding of a stationary element is measured. A position of the movable element is determined from the measured induced voltage. In addition to the thus-determined position of the movable element, a position of the movable element measured on a different basis is used to measure an error regarding the position of the movable element.

25 Claims, 11 Drawing Sheets

ENERGY CONVERTER CONTROL APPARATUS, AND CONTROL METHOD THEREOF

INCORPORATION BY REFERENCE

The disclosure of Japanese Patent Application No. 2002-134642 filed on May 9, 2002, including the specification, drawings and abstract, is incorporated herein by reference in its entirety.

BACKGROUND OF THE INVENTION

1. Field of the Invention

The invention relates to a control apparatus for controlling an energy converter, such as electric motors that covert electric energy into kinetic energy, including rotary motors whose movable element is a rotor that undergoes rotational motion, and linear motors whose movable element is a slider that undergoes linear motion, or generators that convert kinetic energy into electric energy by rotating or moving a movable element, and also relates to a control method thereof.

2. Description of the Related Art

FIG. 10 illustrates the principle of a two-pole alternating-current motor (synchronous motor). This drawing schematically illustrates a revolving-field type motor in which an armature winding is provided on a stationary element (stator), and a field winding is provided on a movable element (rotor). The electric motor having this structure is termed revolving-field type motor. In contrast, an electric motor having a structure in which a field winding is provided on the stationary element side and an armature winding is provided on the rotor side is termed revolving-armature type motor. In general, the revolving-field type motors are simpler in structure than the revolving-armature type motors, and the revolving-field type motors require lower field voltage and current than the revolving-armature type motors. Therefore, the revolving-field type motors are more often employed. When the field winding provided on the rotor is excited, the rotor becomes an electric magnet, and rotates synchronously with revolving magnetic fields produced by three-phase alternating currents supplied to the stationary element side.

A three-phase brushless motor which is a permanent magnet-type synchronous motor is described in Japanese Patent Application Laid-Open Publication No. 9-47066.

FIG. 11 is a block diagram of a brushless motor 4 similar to the brushless motor described in Japanese Patent Application Laid-Open Publication No. 9-47066. An alternating-current signal voltage output from an alternating-current oscillator 1 is converted into a direct-current bias voltage by an AC/DC converter portion 2, and is supplied to an inverter circuit 3. The inverter circuit 3 is driven by a control signal output from a drive circuit 7 so as to generate a three-phase alternating-current voltage from the direct-current bias voltage.

The inverter circuit 3 has three transistor arrays that are provided in parallel between direct-current bias voltages. A first transistor array is made up of a transistor Ua, and a transistor X that are connected in series. A second transistor array is made up of a transistor Va and a transistor Y that are connected in series. A third transistor array is made up of a transistor Wa and a transistor Z that are connected in series. A diode is connected between the emitter and the collector of each transistor, thus allowing passage of current only in one direction. If the transistors are field-effect transistors, a diode is connected between the source and the drain of each transistor.

If current is allowed to flow by turning on the downstream-side transistor while maintaining the off state of the upstream-side transistor of an array, the electric potential at a boundary node between the upstream and downstream-side transistors drops. In the case of the converse on/off states, the potential rises. In this manner, the boundary node potential in a transistor array can be raised and dropped by switching the transistors via a drive circuit 7. By shifting the alternating currents caused by variations of the boundary node potentials occurring in the first, second and third transistor arrays by 120 degrees in phase, three-phase alternating current can be generated. A command for the transistor switching for the purpose of generating three-phase alternating current is output from a control circuit 6.

If three-phase alternating current is randomly supplied to armature windings U, V, W, the motor becomes out of synchronization. Therefore, three-phase alternating current is supplied synchronously with the present position of a movable element of the motor. If the phase of three-phase alternating current is adjusted by detecting the position of the movable element, a feedback control can be realized by detecting the position of the movable element and adjusting the phase of three-phase alternating current based on that detected position. If the phase of three-phase alternating current is adjusted on the basis of the position of the movable element that is expected upon supply of the three-phase alternating current, an open-loop control can be performed. In order to perform the open-loop control, it is necessary to detect the phase of three-phase alternating current. In the example shown in FIG. 11, therefore, a position detector circuit 5 is connected to the three armature windings.

In conjunction with a control apparatus disclosed in Japanese Patent Application Laid-Open Publication No. 9-47066, a method for detecting the mounting error of a magnetic pole position sensor in order to accurately determine the position of the movable element is disclosed. In this method, the inverter circuit is opened, and an induced voltage is measured. Then, a mounting error is detected by comparing the induced voltage with an output of the magnetic pole position sensor. Since such an error incurs a reduction in driving efficiency, it is preferable that the error be minimized.

However, a problem of the aforementioned control apparatus is that unless many special circuits are used, sufficient error detection cannot be achieved.

SUMMARY OF THE INVENTION

It is an object of the invention to provide energy converter control apparatus and method capable of measuring an error regarding the position of a movable element while employing a simple construction.

A first aspect of the invention relates to an energy converter control apparatus for controlling an energy converter which has a movable element that has a field winding, and a stationary element that has an armature winding, and which is able to move the movable element by supplying an alternating current to the armature winding while supplying a current to the field winding. During a state where supply of the alternating current to the armature winding is suspended, the energy converter control apparatus moves the movable element while the field winding is supplied with a current that is at most a predetermined value, and measure an induced voltage induced in the armature winding. Since the induced voltage corresponds to the position of the movable element, it is possible to determine the position of the movable element from the induced voltage.

A second aspect of the invention relates to an energy converter control apparatus for controlling an energy converter which has a movable element, and a stationary element that has a plurality of armature windings, and which is able to move the movable element by supplying a multiphase alternating current to the armature windings. The apparatus supplies a current to the armature windings so that the current through the armature windings becomes zero while the movable element is moving, and measures a voltage of the armature windings.

In this case, the voltage of the armature windings changes in accordance with the position of the movable element. Since the voltage of the armature windings corresponds to the position of the movable element, it is possible to determine the position of the movable element from the voltage of the armature windings.

A third aspect of the invention relates to a method for controlling an energy converter which has a movable element that has a field winding, and a stationary element that has an armature winding. The method includes the steps of: supplying the field winding with a current that is at most a predetermined value and that is able to move the movable element during a state where supply of the alternating current to the armature winding is suspended; and measuring an induced voltage induced in the armature winding while the current is supplied to the field winding.

In this method, as a current that is at most a predetermined value and that is able to move the movable element, a level of current that does not cause power generation is supplied to the field winding. At this time, an induced voltage induced in the armature winding is measured. As in the first aspect of the invention, it is possible to determine a position of the movable element from the measured induced voltage.

The fourth aspect of the invention relates to a method for controlling an energy converter which has a movable element, and a stationary element that has a plurality of armature windings. The method includes the steps of: supplying a current to the armature windings so that the current through the armature windings becomes zero during a state where the movable element is moving; and measuring a voltage of the armature windings while the armature windings are supplied with the current.

Since the voltage of the armature windings changes in accordance with the position of the movable element, this method allows the position of the movable element to be determined from the measured voltage of the armature windings as in the second aspect of the invention.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Figure 1:
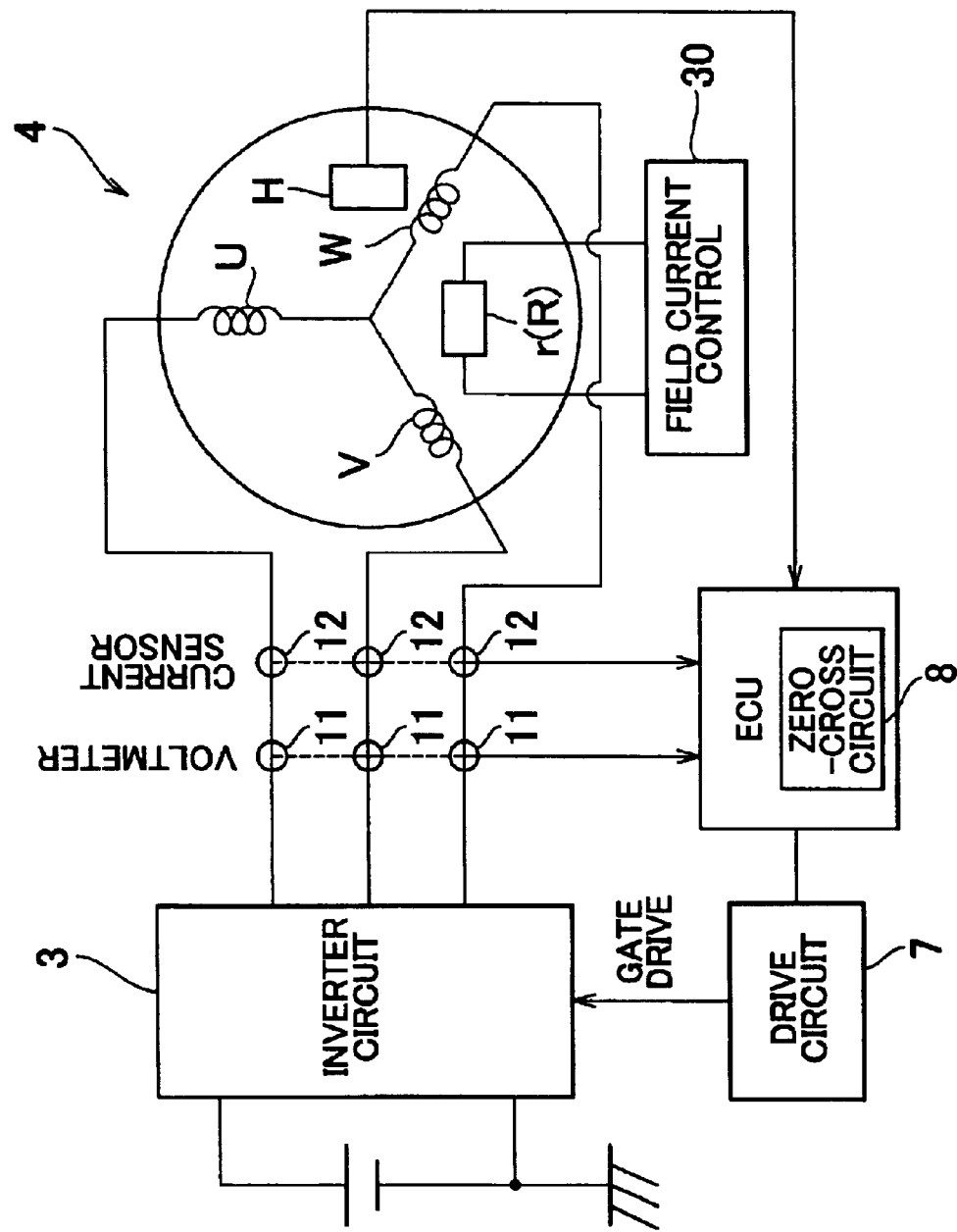
FIG. 1 is a block diagram of a rotary motor and a rotary motor control apparatus in accordance with a first embodiment.

Energy converter control apparatuses in accordance with preferred embodiments of the invention will be described hereinafter with reference to the accompanying drawings. Like components are represented by like reference characters in the drawings, and will not be repeatedly described.

First Embodiment

An energy converter in this embodiment is an apparatus that converts electric energy into kinetic energy or converts kinetic energy into electric energy, and represents an electric motor or a generator. Specifically, the "energy converter" means an electric motor, such as a rotary motor whose movable element is a rotor that undergoes rotational motion, a linear motor whose movable element is a slider that undergoes linear motion, etc., or a generator that generates electric power by rotating a movable element. Due to the reversibility in energy conversion, electric motors and generators have substantially the same basic structure. Description will be made below in conjunction with a case where the energy converter is a rotary motor.

Figure 10:
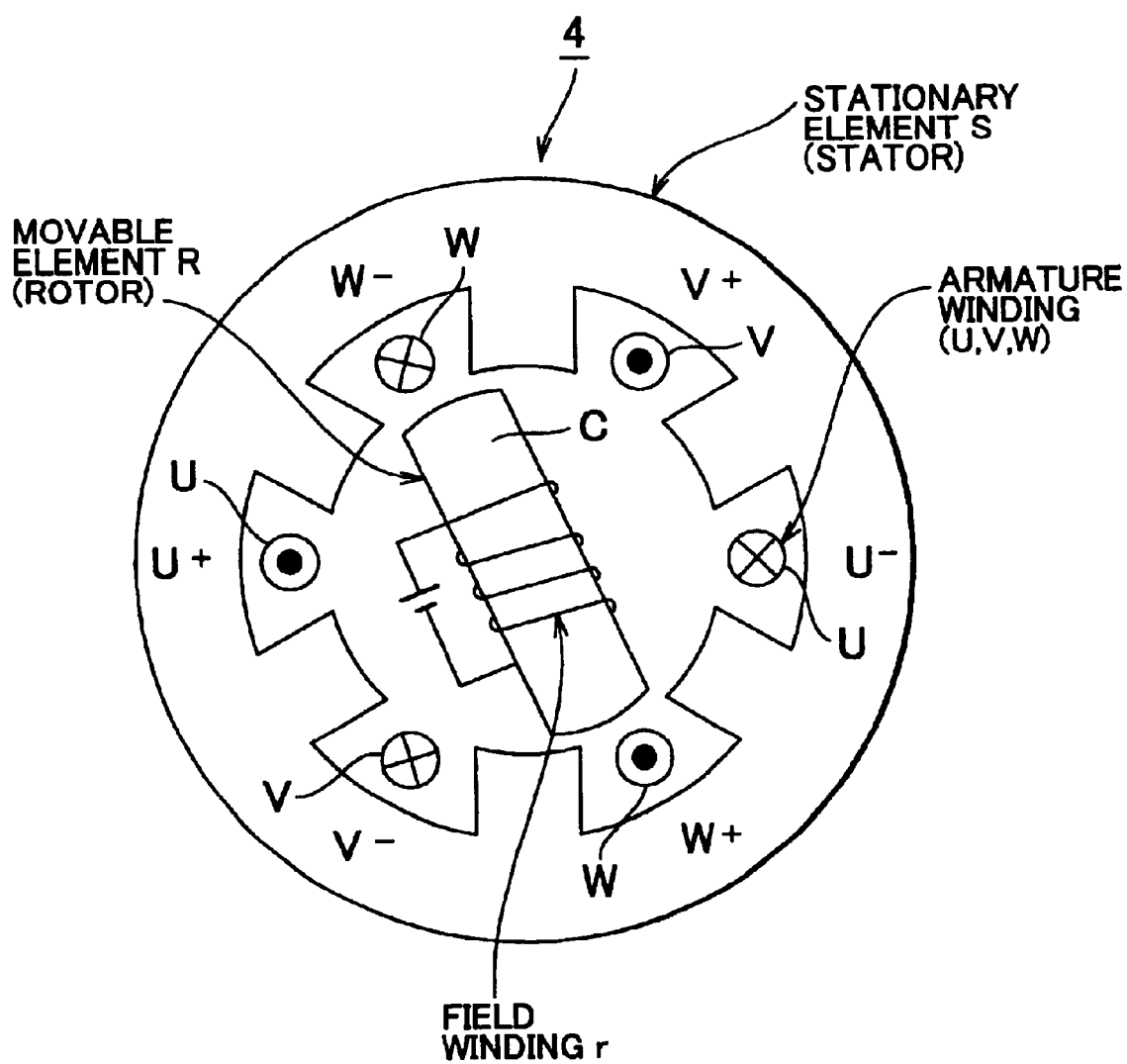
FIG. 10 is a diagram for illustrating the principle of a two-pole alternating-current electric motor (synchronous motor)

FIG. 1 is a block diagram of a rotary motor and a rotary motor control apparatus in accordance with the first embodiment. A rotary motor 4 in FIG. 1 is a revolving field type three-phase brushless motor, and has a structure as shown in FIG. 10. That is, the motor 4 has a movable element R that has a magnetic material-made core C and a field winding r, and a stationary element S that has armature windings U, V, W. The movable element R can be moved (rotated) by supplying alternating current to the armature windings U, V, W via an inverter circuit 3 while supplying current from a field current control circuit 30 to the field winding r in accordance with a command from an electronic control unit ECU.

Figure 11:
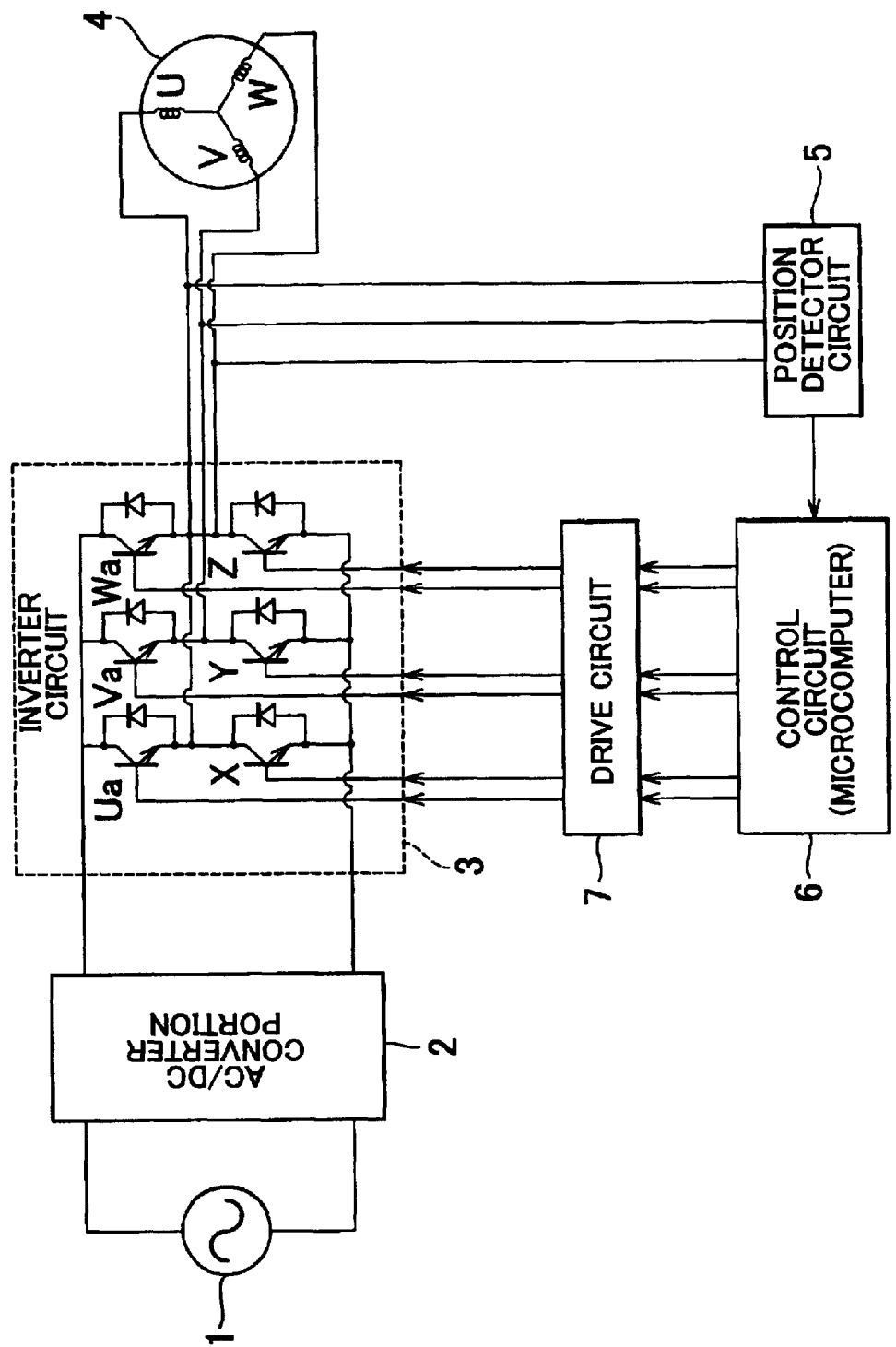
FIG. 11 is a block diagram of a brushless motor 4 similar to the brushless motor described in Japanese Patent Application Laid-Open Publication No. 9-4706.

The motor 4 is provided with peripheral circuits that are substantially the same as those shown in FIG. 11. A direct-current voltage output from an AC/DC converter portion is supplied to the inverter circuit 3. On the basis of a timing signal output from the electronic control unit ECU (control apparatus), the inverter circuit 3 generates three-phase current, and supplies the armature windings U, V, W with alternating current of respective phases. Provided between the electronic control unit ECU and the inverter circuit 3 is an appropriate drive circuit 7 that generates a timing for generating three-phase alternating current from an output timing of the electronic control unit ECU.

The rotational position of the movable element R (not shown in FIG. 1 (see FIG. 10)) can be detected by a position detector (Hall sensor) H. An output of the position detector H is input to the electronic control unit ECU.

The voltage (potential) of each of the armature windings U, V, W detected by voltmeters 11 and the respective values of the currents therethrough detected by current sensors 12 are input to the electronic control unit ECU. The electronic control unit ECU, while suspending the supply of alternating-current voltage from the inverter circuit 3 to the armature windings U, V, W, supplies the field winding r with a current that is less than or equal to a predetermined value If* so as to move (rotate) the movable element, and then measures the induced voltages (potentials) induced in the armature windings U, V, W. Since the induced voltages correspond to the rotational position of the movable element, the aforementioned measurement allows detection of the position of the movable element.

Since the induced voltages correspond to the rotational position of the movable element R, it is possible to determine the position of the movable element from the induced voltages. Using the position of the movable element measured by the position detector H in addition to the position of the movable element determined from the induced voltages, an error of the position of the movable element can be measured.

That is, the electronic control unit ECU calculates an error between the position of the movable element detected by the position detector H and the position of the movable element detected from the induced voltages, and corrects the reference point of the position of the movable element for the position detector H and adjusts the timing of a switching signal output to the inverter circuit 3 so as to eliminate the aforementioned error in the case where the energy converter functions as an electric motor.

If the three-phase alternating current generation-purposed timing signal is to be generated with reference to the position of the movable element detected by the position detector H, it is appropriate to correct the position of the movable element on the basis of the measured error. In the case of a generator, too, similar timing adjustment may be performed if the inverter circuit 3 is driven.

The aforementioned predetermined value If* is a magnitude of current that does not cause power generation. That is, great power generation occurs if the current supplied to the field winding r becomes greater than a certain value. Therefore, in this apparatus, a current that does not cause power generation is defined as a predetermined value If*, and a current that is less than or equal to the value If* is supplied to the field winding r. In this case, too, an induced voltage can be measured since the current is not zero.

Figure 2:
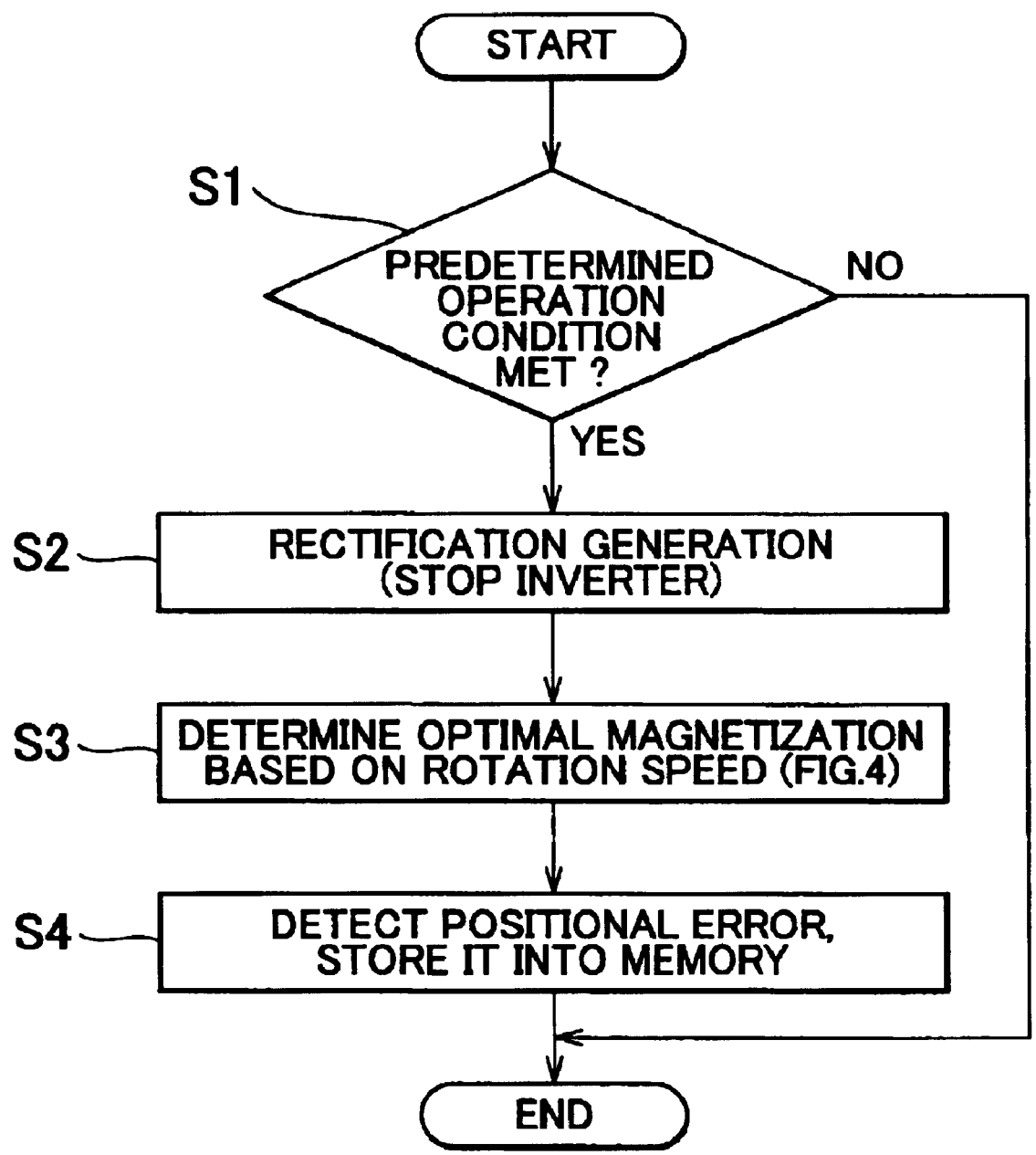
FIG. 2 is a flowchart illustrating a control performed by the control apparatus shown in FIG. 1.

FIG. 2 is a flowchart for describing the aforementioned control. First, in step S1, the electronic control unit ECU determines whether a predetermined operation condition is met. The predetermined operation condition is, for example, in the case of a hybrid vehicle, a condition that the movable element R starts moving due to an external force, for example, a condition that after an internal combustion engine is started up by a self-starting motor, the energy converter starts operating as a generator. In the case of a vehicle, the predetermined operation condition may be a condition where the rotary motor 4 is being driven as a motor or where power generation or regeneration can be suspended. If the predetermined operation condition is not met, the electronic control unit ECU ends the control without entering an error detection mode.

If the predetermined operation condition is met, the electronic control unit ECU enters the error detection mode. During the error detection mode, the electronic control unit ECU first stops the inverter circuit 3 and starts full-wave rectification power generation (rectification generation) in step S2. Subsequently in step S3, the electronic control unit ECU determines a quantity of current (predetermined value If*) that allows optimal excitation on the basis of the moving speed (rotation speed) of the movable element. That is, the current greater than the predetermined value If* causes power generation. If the current is equal to or less than the predetermined value If*, power generation is not caused but the induced voltage is reduced. Therefore, if the current is less than or equal to the predetermined value If*, certain effect can be expected. However, in terms of optimization, it is appropriate to set the current supplied to the field winding r at the predetermined value If*. It is also appropriate that a relationship between the moving speed of the movable element and the predetermined value If* be stored in the form of a map beforehand.

Subsequently in step S4, the electronic control unit ECU detects an error between the position of the movable element detected by the position detector H and the position of the movable element determined from the induced voltages measured during supply of current to the field winding r, and stores the detected error into a memory provided within the electronic control unit ECU.

Figure 3:
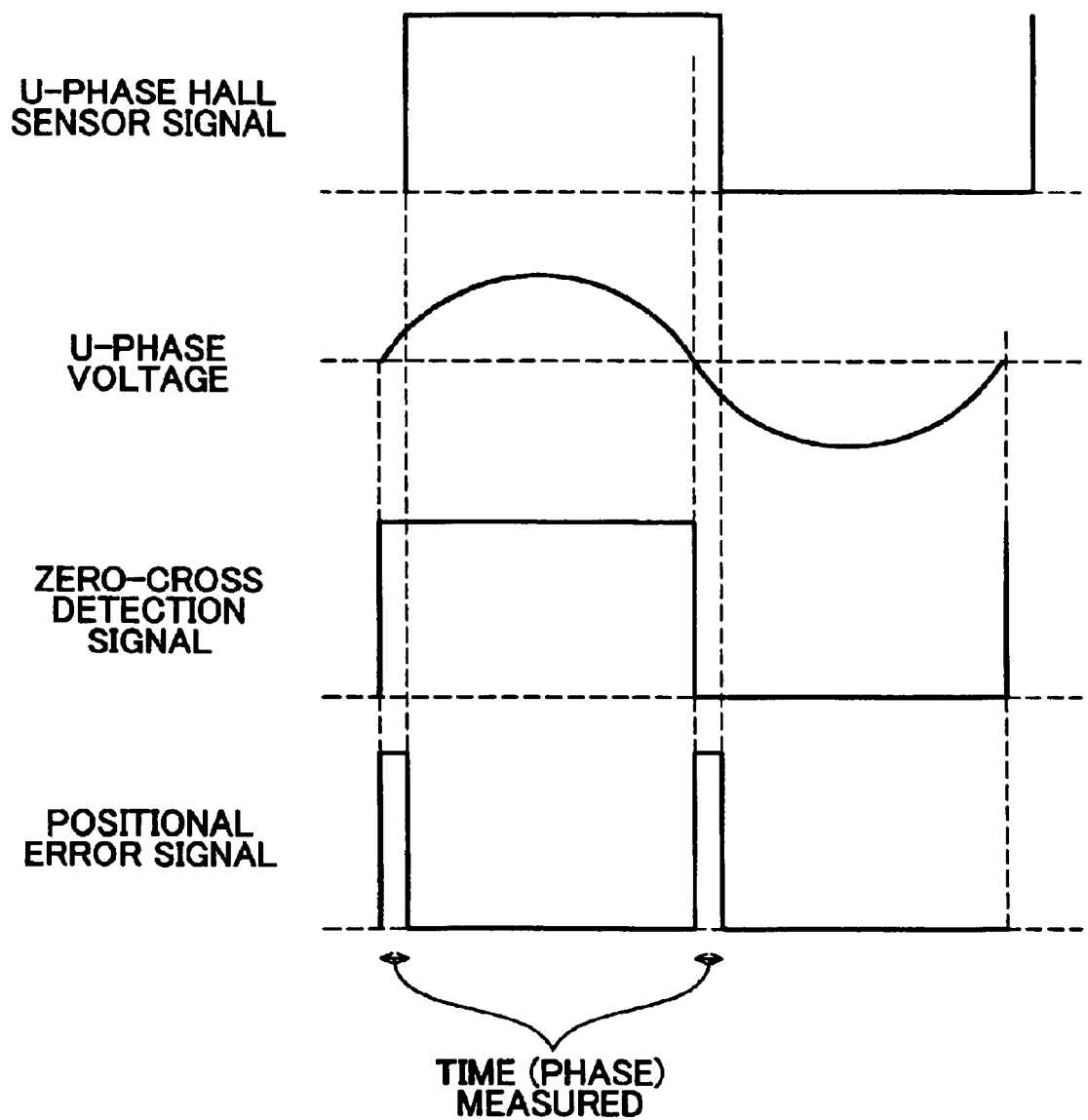
FIG. 3 is a timing chart for explaining the principle of error detection.

FIG. 3 is a timing chart for explaining the principle of the aforementioned error detection. The spatial rotational position of the movable element R is indicated by the signal voltage from the Hall sensor provided as the position detector H near the armature winding U. The output voltage from the voltmeters 11 is detected as an induced voltage (U-Phase Hall sensor signal), as mentioned above. Therefore, the zero-cross timing of the induced voltage is detected.

That is, the electronic control unit ECU has a zero-cross circuit 8 that detects, as a position of the movable element, the timing at which the measured induced voltage crosses a reference voltage level. Since this crossing timing indicates the position (rotation position, i.e., phase) of the movable element R, the position of the movable element R can easily be measured through the use of the zero-cross circuit 8.

The zero-cross circuit, in a narrow meaning, is a circuit that detects the crossing of an alternating current signal with respect to 0 V. However, in this invention, the zero-cross circuit includes a circuit that detects the crossing of an alternating current signal with respect to a reference voltage level other than 0 V. The zero-cross circuit in this embodiment detects the crossing of an alternating current signal with respect to 0 V.

The zero-cross circuit 8 outputs an induced voltage (Zero-Cross detection signal) that has been converted into a rectangular wave. The rectangular wave having a pulse width that is equivalent to a difference between the position of the movable element detected by the position detector H and the position of the movable element determined from the induced voltage measured during supply of current to the field winding r can be determined from a logical product of the rectangular waves of the U-Phase Hall sensor signal and the Zero-Cross detection signal.

Since the electronic control unit ECU has the movable element position detector H that, at the time of measurement of induced voltages by the zero-cross circuit 8, detects the position of the movable element R by a different technique from the zero-cross circuit 8, the electronic control unit ECU is able to determine, as a phase error, the difference between the position of the movable element detected by the position detector H at the time of measurement of induced voltages and the position of the movable element detected by the zero-cross circuit 8. Therefore, it is possible to correct one of the detected positions in accordance with the other detected position. In this embodiment, the output of the position detector H is corrected by the amount of the error.

Figure 4:
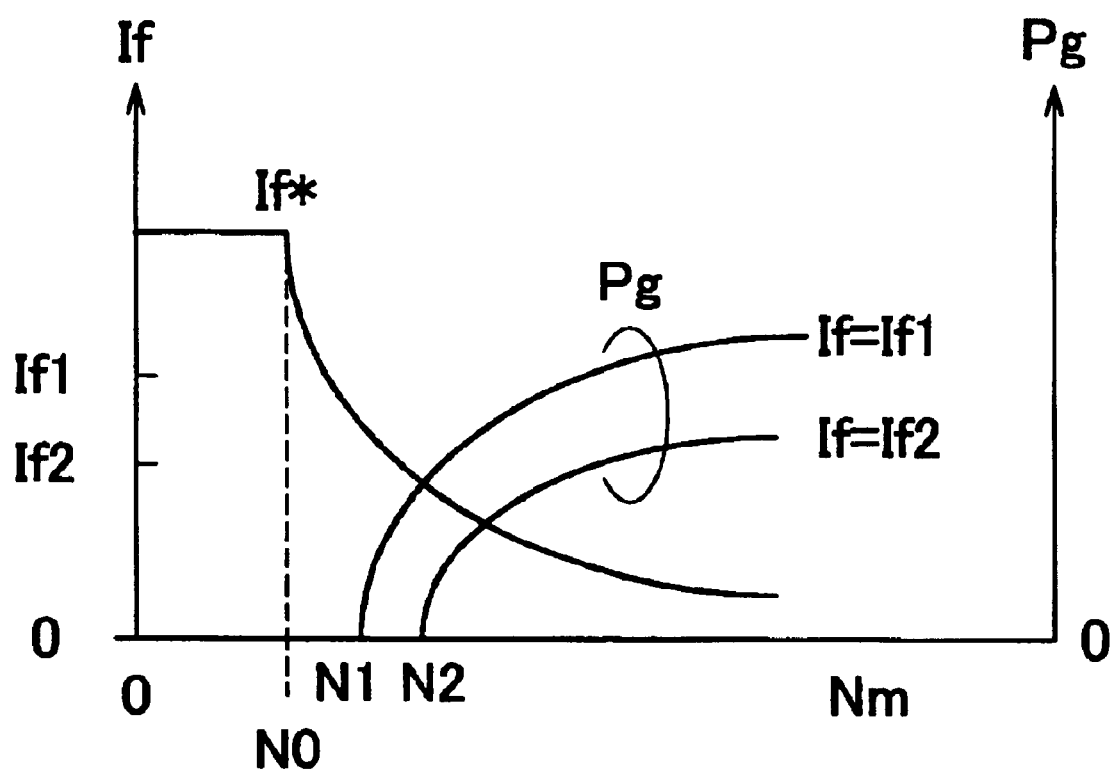
FIG. 4 is a graph indicating relationships of the optimal magnetizable current If* and the amount of power generation Pg with the moving speed (rotation speed) Nm of a movable element.

FIG. 4 is a graph indicating relationships of the optimal magnetizable current If* and the amount of power generation Pg with the moving speed (rotation speed) Nm of the movable element. If the current If is If1, If2, the amount of power generation Pg assumes values that are greater than or equal to zero provided that the rotation speed Nm is greater than or equal to N1, N2. Therefore, if the rotation speed Nm is less than or equal to N0, the optimal current value, that is, the predetermined value If*, is constant. As the rotation speed Nm increases from N0, the predetermined value If* decreases.

If the phase of the alternating current supplied to the armature windings U, V, W is adjusted on the basis of the aforementioned detected difference, the electronic control unit ECU is able to shift the phase of the alternating current to a desired phase so as to conform the position of the movable element to a desired position. That is, the matching between the spatial phase of the position of the movable element and the electrical phase is needed in order to achieve a maximum electric power efficiency when the motor 4 is operating as an electric motor or when power generation is being performed with the inverter circuit 3 driven. If the phase matching of three-phase alternating current is carried out on the basis of only the signal from the position detector H, a maximum electric power efficiency cannot be achieved in the case of occurrence of an error. Moreover, loss of synchronization may result in that case.

Therefore, the position of the movable element detected by the position detector H is corrected by, for example, correcting the position reference point, so as to reduce the error. On the basis of the corrected position of the movable element, three-phase alternating current is generated so as to achieve the phase matching when the rotary motor 4 is driven as an electric motor or when the rotary motor 4 is operated as a generator with the inverter circuit driven.

The phase, period and frequency of the three-phase alternating current can be freely changed by the timing signal from the electronic control unit ECU, that is, at the timing of switching the transistors of the inverter circuit 3. Therefore, the electronic control unit ECU adjusts the phase of the three-phase alternating current by adjusting the timing of the switching accomplished by the inverter circuit 3, which supplies the three-phase alternating current to the armature windings U, V, W.

Second Embodiment

Figure 5:
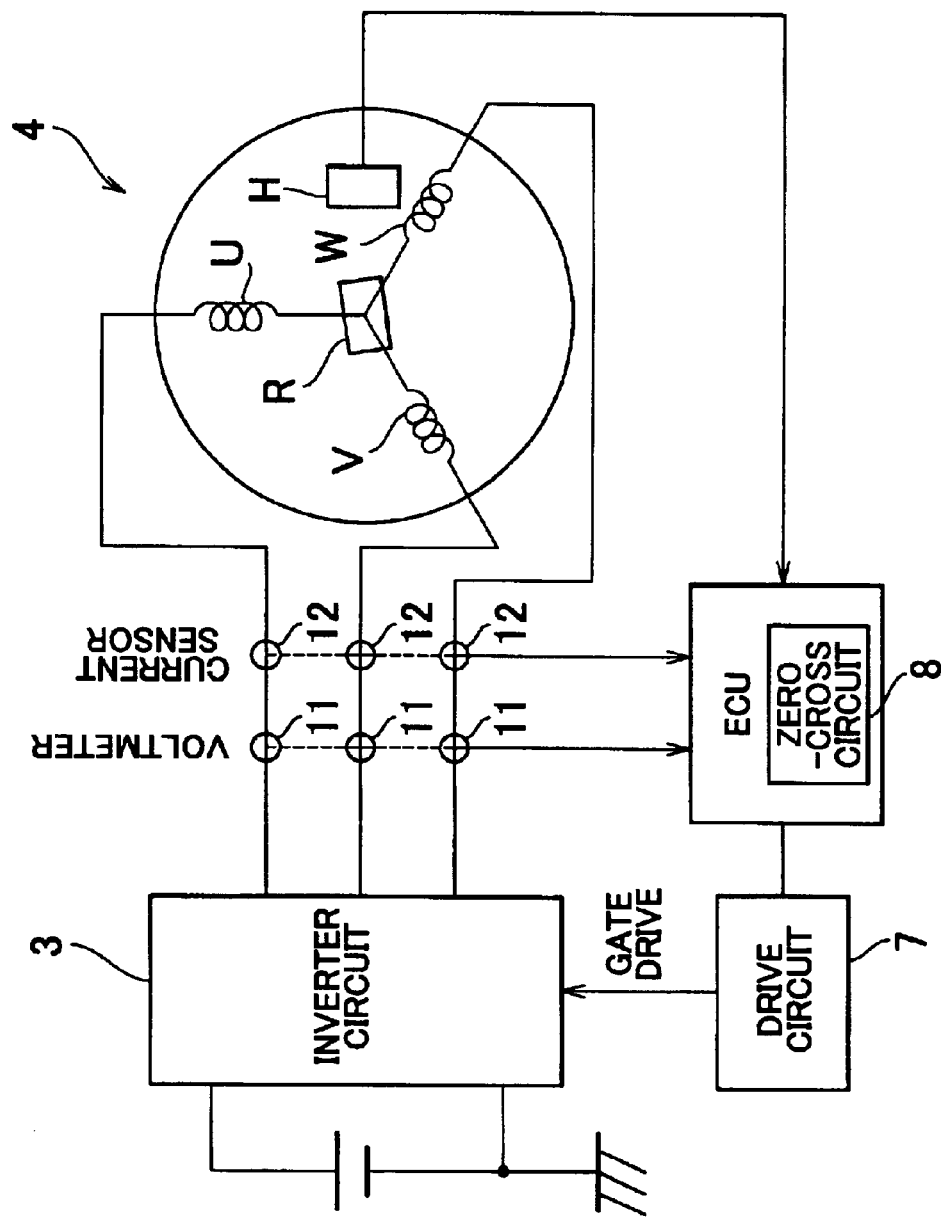
FIG. 5 is a block diagram of a rotary motor and a rotary motor control apparatus in accordance with a second embodiment.

FIG. 5 is a block diagram of a rotary motor and a rotary motor control apparatus in accordance with a second embodiment. A rotary motor 4 is a three-phase brushless motor having a movable element that is formed by a permanent magnet, that is, a three-phase brushless motor obtained by replacing the electromagnet which is made up of the field winding r and the magnetic material-made core C (see FIG. 10) shown in FIG. 1 with a permanent magnet.

That is, the motor 4 has a movable element R, and a stationary element S that has armature windings U, V, W. The movable element R can be moved (rotated) by supplying alternating current to the armature windings U, V, W so as to cause desired attraction and repulsion of the permanent magnet with respect to the magnetic field. That is, the motor 4 has the movable element R, and the stationary element S that has a plurality of armature windings U, V, W, and is capable of moving the movable element R by supplying multi-phase alternating current to the armature windings U, V, W.

An electronic control unit ECU, that is, a control apparatus of the motor 4, supplies the armature windings U, V, W with current so that the current through each of the armature windings U, V, W becomes zero while the movable element R is moving (rotating), and measures the voltages between the armature windings U, V, W.

The voltages between the armature windings U, V, W, for example, the U-V voltage, change in accordance with the position of the movable element R. Since the voltages between the armature windings U, V, W correspond to the position of the movable element R, the position of the movable element (spatial phase during rotation) can be determined from the voltages between the armature windings U, V, W. In addition to the thus-determined position of the movable element, the apparatus of the embodiment measures a position of the movable element on a different basis by using a position detector H, such as a Hall sensor or the like, which is provided in the apparatus. Therefore, the apparatus is able to measure an error regarding the position of the movable element.

Figure 6:
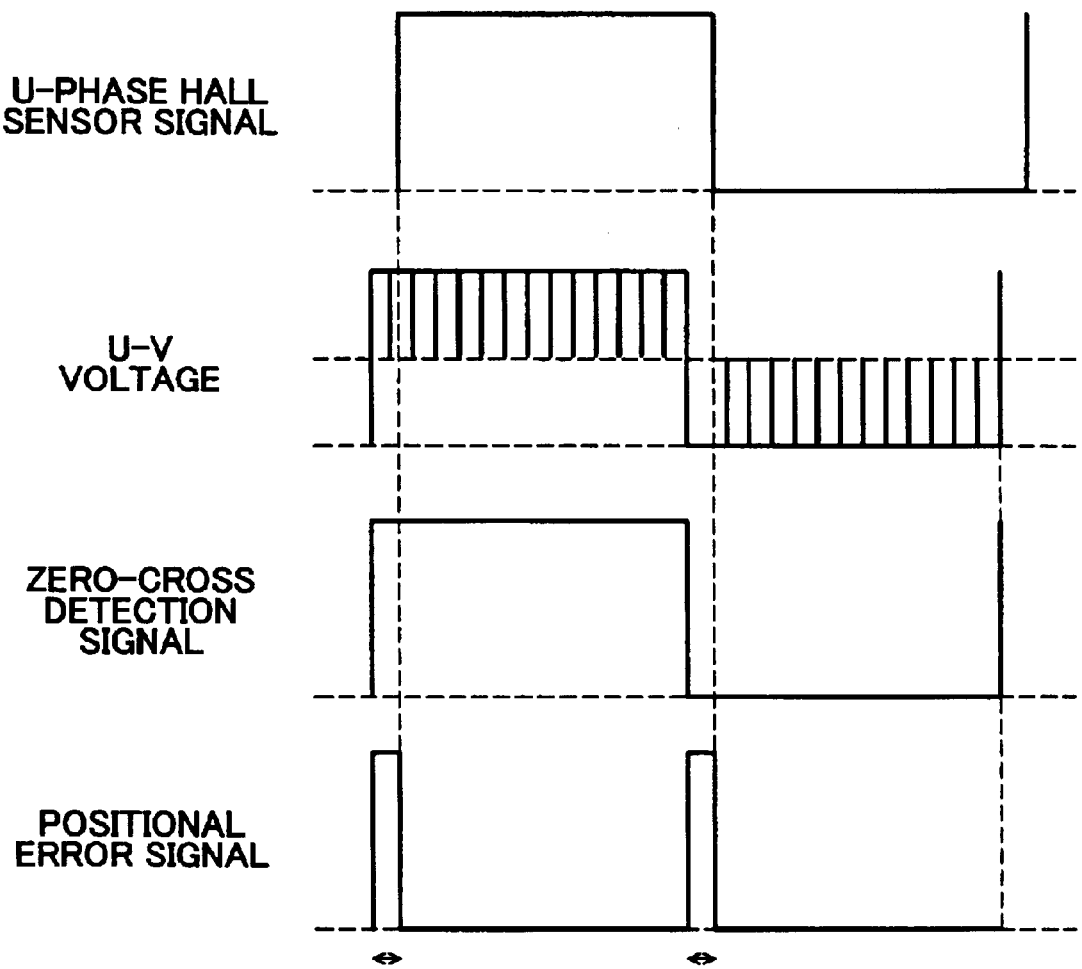
FIG. 6 is a timing chart for explaining the principle of error detection.

FIG. 6 is a timing chart for explaining the principle of the error detection. The spatial position of the movable element R is indicated by a signal voltage from the Hall sensor provided as the position detector H. The electronic control unit ECU detects an inter-winding voltage, for example, U-V voltage, instead of the voltage of each phase. It is also possible to adopt a construction in which V-W voltage or W-U voltage is detected. The inter-winding voltage does not altogether need to be an actual voltage, but may be an instructed voltage from the electronic control unit ECU in a simplified construction.

The electronic control unit ECU has a zero-cross circuit 8 that detects, as a position of the movable element, the timing at which the voltage between the armature windings U, V, W crosses a reference voltage level. Since this crossing timing indicates the position of the movable element, the use of the zero-cross circuit allows easy measurement of the position of the movable element R.

The zero-cross circuit 8 outputs a rectangular wave. The pulse width of a rectangular wave indicating a difference (positional error) between a rectangular wave (U-Phase Hall sensor signal) indicating the position of the movable element detected by the position detector H and the rectangular wave (Zero-Cross detection signal) indicating the position of the movable element detected by the zero-cross circuit can be determined from a logical product of the two rectangular waves of U-Phase Hall sensor signal and Zero-Cross detection signal.

As described above, the electronic control unit ECU detects a difference between the position of the movable element detected by the zero-cross circuit and the position of the movable element detected by the position detector H at the time of measurement of the voltage between the armature windings U, V, W by means of operation of a computer or a difference circuit. Thus, the electronic control unit ECU is able to determine a movable element position difference.

If the phases of the alternating current supplied to the armature windings U, V, W is adjusted on the basis of the aforementioned detected difference, the electronic control unit ECU conforms the phase of the alternating current to a desired phase so as to conform the position of the movable element to a desired position.

That is, the electronic control unit ECU is able to adjust the phase of the alternating current supplied to the armature windings U, V, W by adjusting the timing of the switching performed by the inverter circuit 3, which supplies the alternating current to the armature windings U, V, W. This is because the inverter circuit is able to change the phase and frequency of the generated alternating current by controlling the switching timing.

Figure 7:
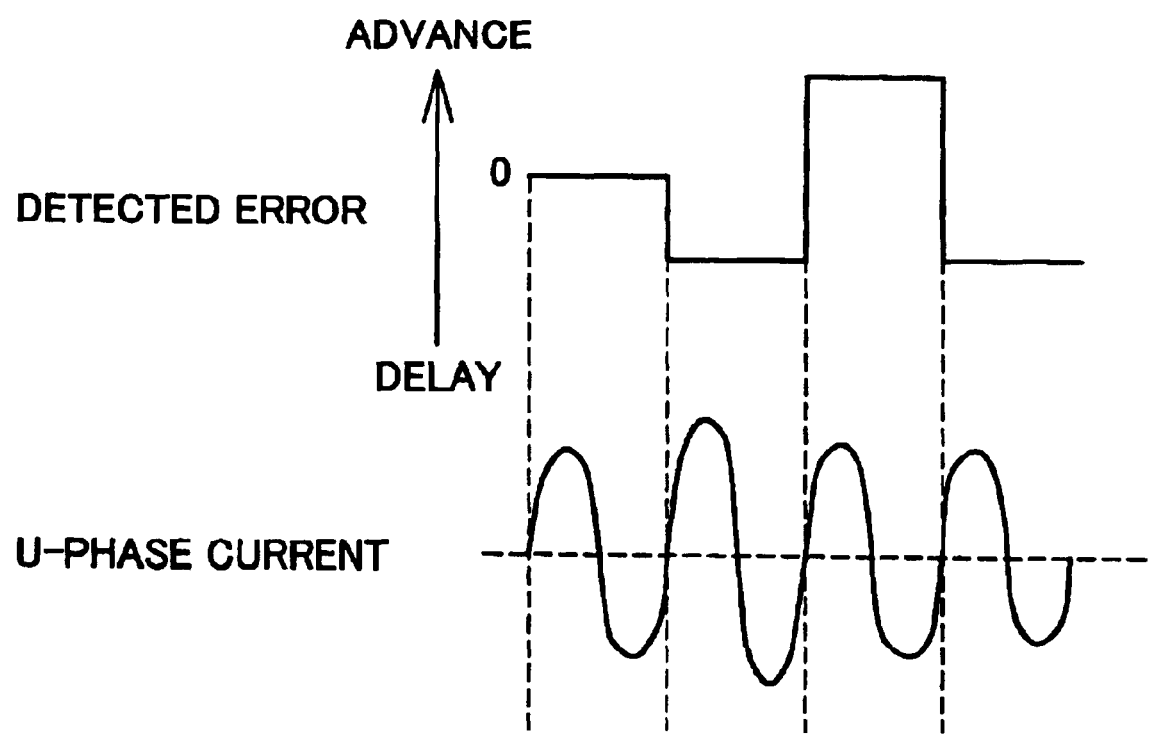
FIG. 7 is a graph indicating a relationship between the U-phase current and the phase error detected at the time of a power-generating operation.

FIG. 7 is a graph indicating a relationship between the U-phase current and the phase error detected at the time of a power-generating operation. That is, depending on the lead/lag of the phase, the amplitude of the U-phase current changes. The change in amplitude occurs on every one of the magnetic poles provided on the stationary element S. Therefore, in any one of the embodiments, the electronic control unit ECU stores a number of values of the aforementioned difference corresponding to the number of magnetic poles formed on the stationary element S, and is able to adjust the switching timing of the inverter circuit 3 separately for the individual magnetic poles on the basis of the stored values of the difference for the individual magnetic poles. In the case of the Hall sensor, the magnetization of the magnetic poles is likely to vary. In an ordinary case where the Pulse With Modulation (PWM) switching is performed on the basis of the Hall sensor, current ripple and torque ripple are likely to result. If correction is performed separately for each magnetic pole, smooth driving becomes possible.

That is, the zero point of the position of the movable element that serves as a reference for control is corrected separately for each magnetic pole so as to reduce the error. Since the aforementioned difference is stored as the amount of phase deviation for each magnetic pole, more accurate alternating current phase adjustment can be accomplished. Therefore, the efficiency during the operation as an electric motor or the power generation with the inverter driven will increase. Performing this correction operation for each magnetic pole is ideal. However, the correction operation may also be performed by using an average value among differences for each magnetic pole during a single rotation. Furthermore, taking into the CPU throughput into consideration, the correction operation may be performed by obtaining an average among differences for one magnetic pole during a single rotation.

Figure 8:
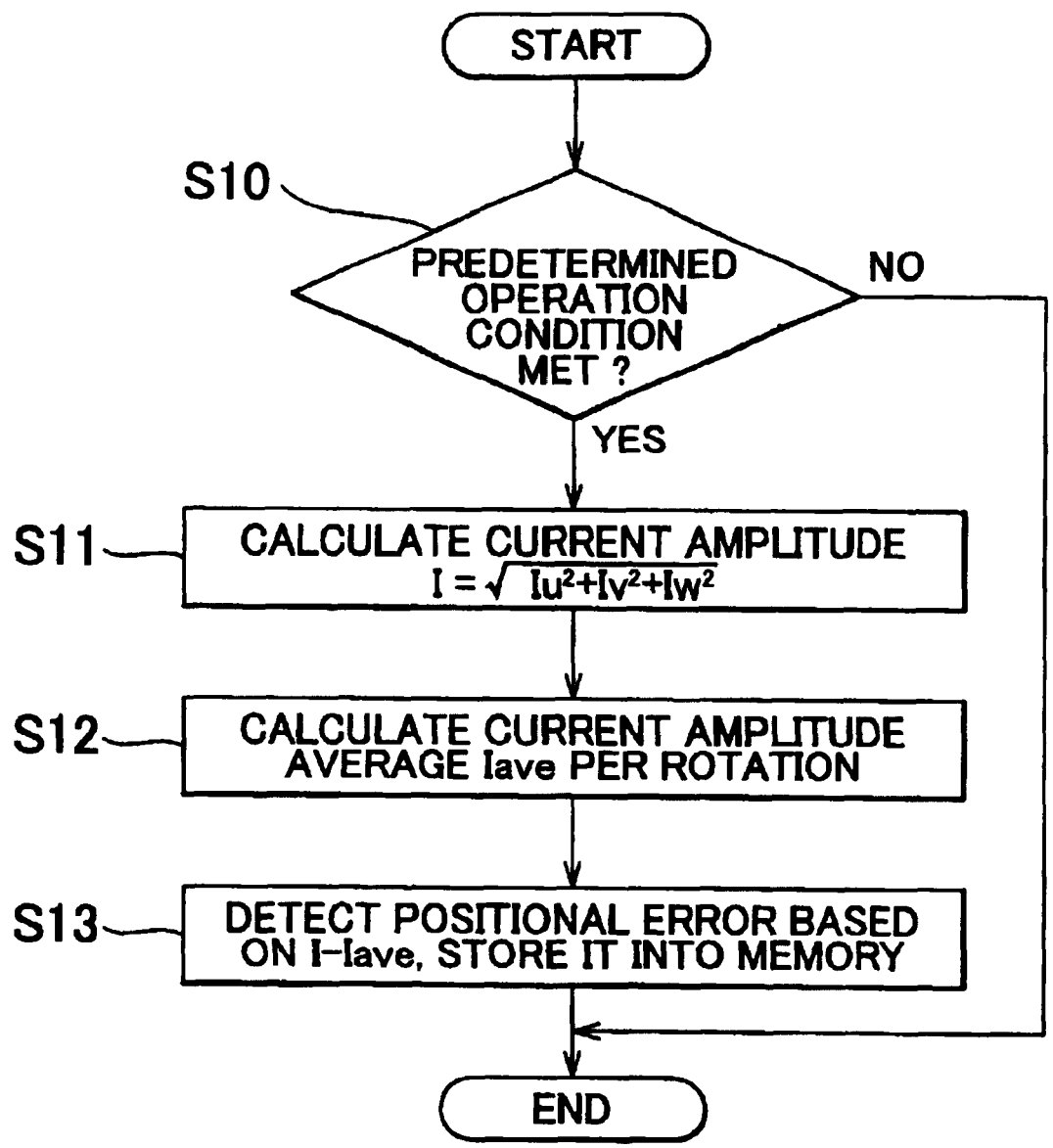
FIG. 8 is a flowchart illustrating a program executed within an electronic control unit ECU for the purpose of detecting a phase error.

FIG. 8 is a flowchart illustrating a program executed within the electronic control unit ECU for the purpose of detecting a phase error. First in step S10, it is determined whether a predetermined operation condition is met. If the operation condition is met, an error storage mode is entered. If the operation condition is not met, the control ends. Examples of the predetermined operation condition, for example, in the case of a hybrid vehicle incorporating an electric motor and an internal combustion engine, include a condition that after the internal combustion engine is started up by driving a self-starting motor, the electric motor enters a power generator mode, and the like.

Subsequently in step S11, an average of the currents Iu, Iv, Iw through the U-phase winding, the V-phase winding and the W-phase winding is calculated in accordance with a current amplitude calculating expression: $I=(Iu^2+Iv^2+Iw^2)^{1/2}$.

Subsequently in step S12, a time average Iave of the thus-determined current amplitude for each rotation of the movable element R is calculated. In step S13, a difference between the time average Iave and the present current amplitude I is detected as a positional error (phase error), and is stored in the memory. If an instantaneous current amplitude I is set for each magnetic pole, correction by the inverter circuit 3 is performed for each magnetic pole. That is, if the amplitude I is greater than the average value Iave, it is determined that a phase delay is present. Then, control for advancing the phase is performed. If the amplitude I is smaller than the average value Iave, control in a converse manner is performed. Although the average value Iave is used as a reference in this embodiment, it is also possible to use a reference value corresponding to a specific operation condition instead of the average value Iave. Through the aforementioned control, the current ripple and the torque ripple can be considerably reduced.

In either one of the controls in the first and second embodiments, the phase error is not information that needs constant update, and it is appropriate that the phase error be stored in a non-volatile memory or the like, and be updated when necessary. Therefore, if there is an error in the precision of the position detector H itself or the mounting precision thereof, the above-described control allows stable torque performance, maximum torque (the cranking torque produced by a vehicular energy converter, etc.), and optimal efficiency control.

In any one of the controls described above, the phase of the alternating current supplied to the armature windings U, V, W at the time of operation of the energy converter as an electric motor can be adjusted in accordance with the difference between the reference current and the current that flows through the armature windings U, V, W at the time of movement (rotation) of the movable element R.

If this reference current is set at the time of the matching between the spatial phase of the movable element R and the electrical phase supplied to the armature windings U, V, W, the difference between the reference current and the current that flows through the armature windings U, V, W at the time of movement of the movable element will correspond to an error in phase. Therefore, the use of the aforementioned difference minimizes the error.

The reference current may be an average value of currents output from the armature windings U, V, W. If the present electric current deviates from the average value, it is appropriate to advance or delay the phase of supplied current in accordance with the amount of deviation.

If the movable element R is a rotor that rotates relatively to the stationary element S, the energy converter can be caused to function as a rotary type electric motor or a rotary type generator. In that case, the electric motor or generator can be applied to, for example, a drive power source of a vehicle. Thus, the above-described electronic control unit ECU is able to control an energy converter, such as electric motors, including rotary motors whose movable element R is a rotor that undergoes rotational motion, and linear motors whose movable element R is a slider that undergoes linear motion, or generators that generate electric power by rotating a movable element.

In the second embodiment, the aforementioned voltage between the armature windings U and V may be changed to a voltage across a single armature winding. In this case, too, the position of the movable element can be detected. That is, in this modification of the second embodiment, while the movable element R is moving, the armature winding U is supplied with current so that the current through the armature winding U becomes zero, and the voltage of the armature winding U alone is measured.

Figure 9:
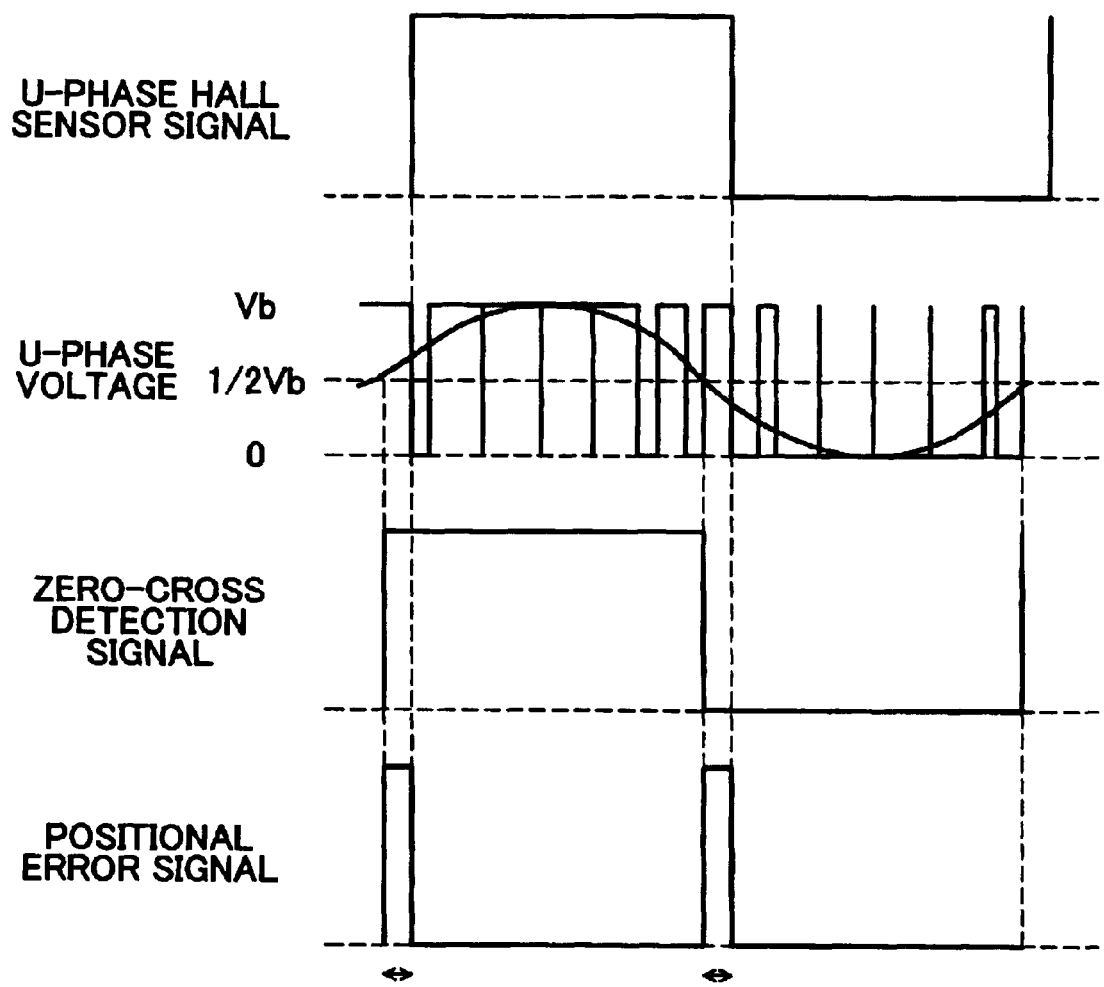
FIG. 9 is a timing chart for explaining the principle of error detection in accordance with a modification of the second embodiment.

FIG. 9 is a timing chart for explaining the principle of error detection in the aforementioned construction.

The spatial rotational position of the movable element R is indicated by a signal voltage from a Hall sensor provided as the position detector H near the armature winding U. The output voltage of the position detector H is detected as a voltage of the armature winding alone (a reference is a lower side of a direct-current voltage) by the filtering via a low-pass filter. The zero-cross timing of the filtered voltage is detected. The zero-cross timing is detected by comparing a fundamental wave component of the voltage of the armature winding alone from which a carrier component has been removed by the low-pass filter with a reference voltage Vb/2 (Vb being a direct-current voltage).

That is, the electronic control unit ECU of the modification of the second embodiment has a zero-cross circuit that detects, as a position of the movable element, the timing at which the aforementioned measure voltage crosses a reference voltage level. Since the crossing timing indicates the position (rotational position, phase) of the movable element R, the use of the zero-cross circuit allows easy measurement of the position of the movable element R.

The zero-cross circuit outputs the aforementioned voltage converted into a rectangular wave. The rectangular wave having a pulse width that is equivalent to a difference between the position of the movable element detected by the position detector H and the position of the movable element determined from the aforementioned voltage of the armature winding alone can be determined from a logical product of the rectangular waves from the zero-cross circuit and the position detector H.

Since the electronic control unit ECU has the movable element position detector H that, at the time of measurement of the voltage of the armature winding alone, detects the position of the movable element R by a different technique from the measurement of the voltage of the armature winding, the electronic control unit ECU is able to determine, as a phase error, the difference between the position of the movable element detected by the movable element position detector H at the time of measurement of the voltage and the position of the movable element detected by the zero-cross circuit. Therefore, it is possible to correct one of the detected positions in accordance with the other detected position. In this example, the output of the position detector H is corrected by the amount of the error.

The controls in the first embodiment, the second embodiment and its modification may also be applied to parallel hybrid type vehicles in which wheels are driven by an internal combustion engine and an electric motor supplied with electric power from a battery, and the two drive power sources can be selectively used in accordance with situations, and power from the internal combustion engine can be used to drive a generator so as to charge the battery during the running of the vehicle. The above-described controls may also be applied to series hybrid type vehicles in which an internal combustion engine is used to drive a generator so as to generate electric power, and electric power is supplied to an electric motor for the driving of the vehicle.

Although in the first embodiment, the second embodiment and its modification, the position detector H is a Hall sensor, it is also possible to use a resolver or a photocoupler as a position detector H.

According to the energy converter control apparatuses of the first embodiment, the second embodiment and its modification, it is possible to measure an error regarding the position of the movable element while employing a simple construction.

While the invention has been described with reference to what are presently considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single embodiment, are also within the spirit and scope of the invention.

What is claimed is:

1. An energy converter control apparatus for controlling an energy converter which has a movable element that has a field winding, and a stationary element that has an armature winding, and which is able to move the movable element by supplying an alternating current to the armature winding while supplying a current to the field winding, comprising:

a controller that controls the current supplied to the field winding and the current supplied to the armature winding; and a measuring instrument that measures an induced voltage induced in the armature winding while the controller supplies a current that is at most a predetermined value to the field winding so as to move the movable element during the controller suspends supply of the alternating current to the armature winding.

2. The apparatus according to claim 1, wherein the measuring instrument includes a zero-cross circuit that detects, as a position of the movable element, a crossing timing at which the induced voltage measured crosses a reference voltage level.

3. The apparatus according to claim 2, by further comprising a movable element position detector that detects a position of the movable element and is different from the zero-cross circuit.

4. The apparatus according to claim 3, wherein the controller detects a difference between the position of the movable element detected by the zero-cross circuit and the position of the movable element detected by the movable element position detector at a time of measurement of the induced voltage.

5. The apparatus according to claim 4, wherein the controller adjusts a phase of the alternating current supplied to the armature winding based on the detected difference.

6. The apparatus according to claim 5, wherein adjustment of the phase of the alternating current is performed by adjusting a switching timing of an inverter circuit that supplies the alternating current to the armature winding.

7. The apparatus according to claim 6, wherein the controller stores the difference for a number corresponding to a number of magnetic poles formed on the stationary element, and adjusts the switching timing of the inverter circuit separately for each magnetic pole based on the stored difference for each magnetic pole.

8. The apparatus according to claim 1, wherein when the energy converter functions as an electric motor, the controller adjusts a phase of the alternating current supplied to the armature winding in accordance with a difference between a reference current and a current that flows through the armature winding at a time of movement of the movable element.

9. The apparatus according to claim 8, wherein the reference current is an average value of currents output from the armature windings.

10. The apparatus according to claim 1, wherein the movable element is a rotor that rotates relatively to the stationary element.

11. The apparatus according to claim 1, wherein the current that is at most the predetermined value is a magnitude of current that does not cause power generation in the energy converter.

12. An energy converter control apparatus for controlling an energy converter which has a movable element, and a stationary element that has a plurality of armature windings, and which is able to move the movable element by supplying a multi-phase alternating current to the armature windings, comprising:

a controller that controls the current supplied to the armature windings; and a measuring instrument that measures a voltage of the armature winding while the controller supplies a current to the armature winding so that the current through the armature winding becomes zero during a state where the movable element is moving.

13. The apparatus according to claim 12, wherein the measuring instrument includes a zero-cross circuit that detects, as a position of the movable element, a crossing timing at which the voltage of the armature windings crosses a reference voltage level.

14. The apparatus according to claim 13, further comprising a movable element position detector that detects a position of the movable element by a technique different from a detection technique regarding the zero-cross circuit.

15. The apparatus according to claim 14, wherein the controller detects a difference between the position of the movable element detected by the zero-cross circuit and the position of the movable element detected by the movable element position detector at a time of measurement of the voltage of the armature windings.

16. The apparatus according to claim 15, wherein the controller adjusts a phase of the alternating current supplied to the armature windings based on the detected difference.

17. The apparatus according to claim 16, wherein adjustment of the phase of the alternating current is performed by adjusting a switching timing of an inverter circuit that supplies the alternating current to the armature windings.

18. The apparatus according to claim 17, wherein the controller stores the difference for a number corresponding to a number of magnetic poles formed on the stationary element, and adjusts the switching timing of the inverter circuit separately for each magnetic pole based on the stored difference for each magnetic pole.

19. The apparatus according to claim 12, wherein when the energy converter functions as an electric motor, the controller adjusts a phase of the alternating current supplied to the armature winding in accordance with a difference between a reference current and a current that flows through the armature winding at a time of movement of the movable element.

20. The apparatus according to claim 19, wherein the reference current is an average value of currents output from the armature windings.

21. The apparatus according to claim 12, wherein the movable element is a rotor that rotates relatively to the stationary element.

22. The apparatus according to claim 12, wherein the voltage of the armature windings is a voltage of one of the armature windings or a voltage between the armature windings.

23. The apparatus according to claim 12, wherein the current that is at most the predetermined value is a magnitude of current that does not cause power generation in the energy converter.

24. A method for controlling an energy converter which has a movable element that has a field winding, and a stationary element that has an armature winding, characterized by comprising the following steps of:

supplying the field winding with a current that is at most a predetermined value and that is able to move the movable element during a state where supply of the alternating current to the armature winding is suspended; and measuring an induced voltage induced in the armature winding while the current is supplied to the field winding.

25. A method for controlling an energy converter which has a movable element, and a stationary element that has a plurality of armature windings, characterized by comprising the following steps of:

supplying a current to the armature windings so that the current through the armature windings becomes zero during a state where the movable element is moving; and measuring a voltage of the armature windings while the armature windings are supplied with the current.

* * * * *